Dec. 17, 1968

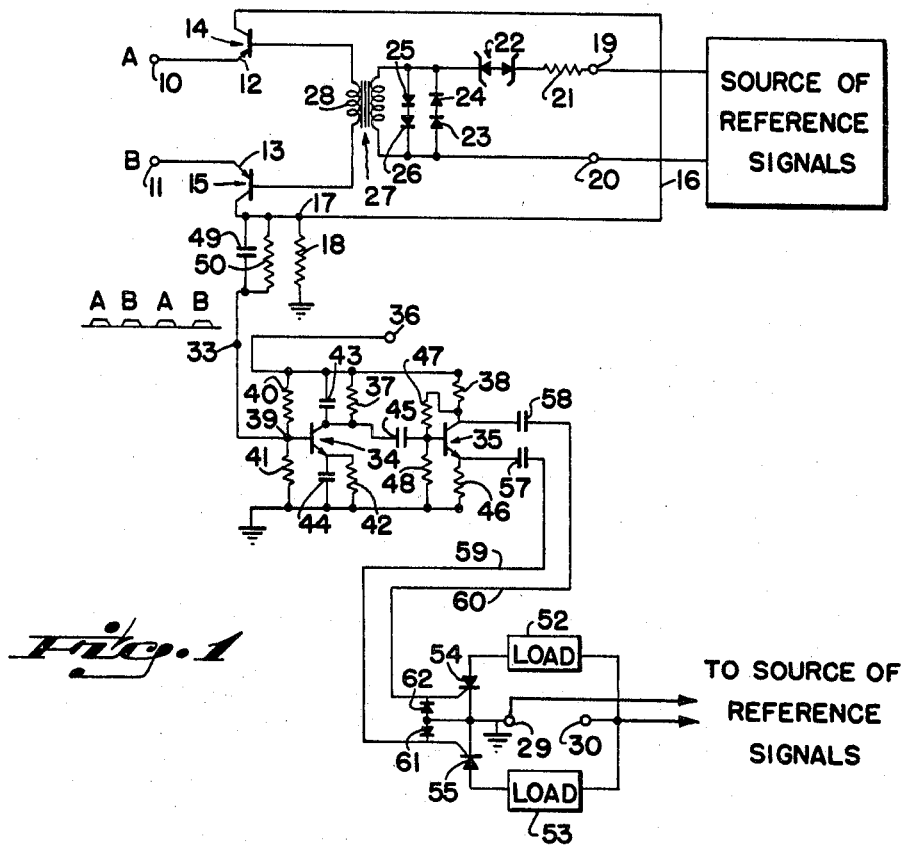
Fig. 1
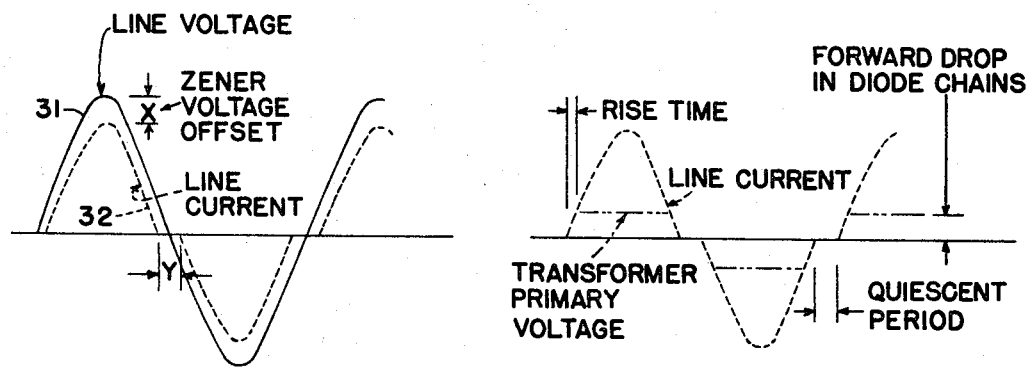
Fig. 2
Fig. 3
*INVENTOR.*
JOHN A. KUECKEN
ATTORNEYS.

J. A. KUECKEN 3,417,255

THRESHOLD SERVO CONTROL SYSTEM

Filed Oct. 18, 1965

INVENTOR.
JOHN A. KUECKEN
BY
ATTORNEYS.

United States Patent Office 3,417,255
Patented Dec. 17, 1968

3,417,255
THRESHOLD SERVO CONTROL SYSTEM
John A. Kuecken, Pittsford, N.Y., assignor to Avco Corporation, Cincinnati, Ohio, a corporation of Delaware
Filed Oct. 18, 1965, Ser. No. 497,116
14 Claims. (Cl. 307—39)

ABSTRACT OF THE DISCLOSURE

This is a servo control system in which the dead space and cross-over characteristics are controlled with precision, to prevent overshooting and hunting. Command voltages are applied to the input terminals of a chopper amplifier. Reference signals are also applied to the chopper amplifier. Between the chopper amplifier and the reference signal source is a means for shaping each sine wave of the reference signal into truncated half wave forms separated by a lead space. The spaced pulses in the output of the chopper amplifier have amplitudes alternately representative of the command voltages. By a means having a single ended input and a double ended output these pulses are amplified and phase inverted so that there appear at one terminal of the double-ended output an amplified component which is in phase with the reference signal, and at the other output terminal an amplified component which is out of phase with the reference signal. The respective voltage levels at the input terminal determine that one of the output terminals in which the in-phase component appears. The output terminals are coupled to two normally non-conductive load circuits, provided with gate elements and so arranged in relationship to the source of reference signals that the load circuit which is coupled to the output terminal producing the in-phase component is rendered conductive.

---

The present invention relates to servo control systems.

The dead space and crossover slope of servo mechanisms require a high order of stability and control when a servo amplifier is used to operate magnetic latching relays, unidirectional direct current motors, stepping relays, and the like. The dead space must be closely matched to the parameters of the device driven, because devices of this general class operate in discrete steps. Failure to match the dead space to the characteristics of the driven device causes the latter to overshoot and to hunt. Additionally, such devices require a steep crossover slope so that the action of the driven device may be quick and positive throughout a wide range of temperatures. This feature is of particular importance at cold ambient temperatures which cause such driven devices to become sluggish in action.

The principal objects of the invention are to provide:

(1) An improvement by which the dead space and cross-over slope characteristics of the servo system are controlled with precision, in order to prevent overshooting and hunting;

(2) A servo amplifier system characterized by particularly large power gain;

(3) In a servo system, a novel transistor chopper network advantageously utilizing a Zener diode for providing offset and diode limiters for wave shaping;

(4) In a servo system, a threshold amplifier in which the difference between waveform outputs of switching transistors is presented to the output;

(5) In such a system, the combination of a chopper amplifier and a network including a silicon controlled rectifier pair so arranged as to result in a difference amplifier of outstanding power gain characteristics;

(6) The combination of diode limiting and Zener control in the primary of a chopper transformer, arranged in such a manner that the chopper amplifier is of adjustable slope and dead space characteristics, whereby only one of the silicon controlled rectifiers coupled to the load can fire at a time;

(7) A servo system in which the width of the dead space is defined principally by the gain of the chopper amplifier, the slope rise being determined substantially independently of the dead space width;

(8) A novel means for utilizing amplifier gain to control dead space; and (9) Novel means for crossover slope control.

For a better understanding of the invention together with other and further objects, advantages and capabilities thereof, reference is made to the following description of the appended drawings in which:

FIG. 1 is a circuit schematic of a complete servo amplifier system in accordance with the invention;

FIG. 2 is a set of amplitude-time curves showing the line voltage and line current as measured at terminals 19–20;

FIG. 3 is a set of amplitude-time curves showing said line current and the primary output voltage of transformer 27;

Figure 4:
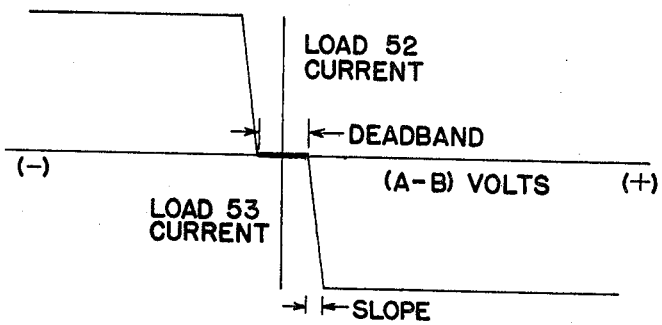
FIG. 4 is a graph of currents in the loads 52 and 53 vs. voltage, with voltages as abscissae and currents as ordinates.

In a broad sense the entire system of FIG. 1 is an operational amplifier of the balanced type, in which the differences between the potentials at input terminals 10 and 11 are amplified. These two terminals may be operated in balanced fashion or, as indicated below, one may be used to sample an order voltage and the other may sample a response signal. In either event the potential differential between terminals A and B is herein treated as constituting the command.

The command signal is a direct current signal applied to input terminals 10 and 11. These terminals may be run either balanced, or one of these terminals may be used to sample a voltage and the other to sample a load-connected feedback signal such as a potentiometer connected to the load. In the embodiment herein described they are balanced and the difference between the voltages at terminals 10 and 11 is utilized. The terminals 10 and 11 constitute the command signal input terminals to the chopper portion of a chopper amplifier which includes certain novel features in accordance with the invention and hereinafter described. These input terminals are connected to the emitters 12 and 13 of a pair of switching transistors 14 and 15 (each Type 2N499), whose collectors are connected together by a conductor 16 which in turn is connected to an output terminal 17. Connected between the output terminal and ground is a resistor 18 (30,000 ohms).

The description of the preferred embodiment assumes for purposes of discussion that the voltages on input terminals 10 and 11 are fixed over any given cycle of the reference signal. However, alternating current voltages at frequencies below that of the reference signal may be applied to terminals 10 and 11 as the command.

The reference sinusoidal signal (32 volts, 400 cycles) is applied to reference input terminals 19 and 20. Reference input terminal 19 is in series with a resistor 21 (2500 ohms) and a Zener diode 22 (Type M 1N2971B). Disposed in shunt relationship with respect to the reference input terminal 20 and the output of diode 22 is a series chain of limiter diodes 23 and 24, connected with one polarity. Additionally in said shunt relationship is another series chain of limiter diodes 25 and 26 connected in the opposite polarity. Each of the diodes 23-26 is illustratively of Type 1N914 and these two chains of diodes are in shunt relationship to the primary of a transformer 27, of which the secondary 28 is connected in balanced relationship to the bases of the switching transistors 14 and 15. Parenthetically, the line or reference signal is also applied to the reference input terminals 29 and 30, for purposes explained hereinafter.

Reference is now made to FIG. 2, in which curve 31 illustrates the line or reference voltage applied to the terminals 19, 20. The Zener voltage offset causes the line current, illustrated by curve 32, to be offset from the line voltage by an amount illustrated at X. That is to say, the Zener diode 22 functions so as to provide an offset in the line current, so that there exists a quiescent period Y when there is no flow of current of either polarity. This discontinuity Y in the crossover of the line current in the no-current region provides a period of no line current flow. The transformer primary voltage is limited and squared off by the forward drop in the two chains of diodes 23-26, one chain acting when the line voltage is of one polarity, and the other chain acting when the line voltage is of the other polarity.

The resultant reference waveforms (FIG. 3) as actually applied to the transformer 27 are trapezoidal in form, with a finite rise time which is related to the relationship between the line voltage and the forward voltage drops of the diode chains and an offset which is related to the relationship between the Zener voltage offset and the line voltage.

As is well known to those of skill in the art, a Zener diode is a specially constructed and doped diode which has a sharply defined breakdown voltage in the reverse direction. That is, it behaves like a normal diode in the forward direction, but in the reverse direction it passes current only when the Zener voltage is exceeded. The reference numeral 22 designates two Zener diodes in a back-to-back arrangement such that the Zener effect is utilized during both portions of each reference signal cycle. Thus, with sine wave voltage excitation applied to a back-to-back Zener pair, no appreciable line current will flow in the primary of transformer 27 until the Zener voltage is exceeded, and when current flows in said primary the reference voltage minus the Zener voltage appears across it. For convenience the element 22 is simply referred to as a Zener diode.

The reference waves as applied to the switching transistors therefore consist of a succession of trapezoids with dead spaces therebetween. These waves, as applied to the bases, are utilized alternately to bias into conductivity switching transistors 14 and 15.

The output terminal 17 of the chopper network is coupled to point 33 (the base of the threshold amplifier transistor 18) by the shunt resistor 18 (30,000 ohms) and a parallel combination of capacitor 49 (10 microfarads) and resistor 50 (20,000 ohms).

The components 49 and 50 serve to provide an appropriate bias to the collectors of transistors 14 and 15 with the capacitor 49 serving to pass the signal (A.C.) wave with low impedance from the chopper. In the embodiment shown the point 39 (base of transistor 34) will assume a potential of +2 to +3 volts. If the chopper drew no current because voltages at terminals 10 and 11 were below a +1 volt level, the voltage at terminal 17 would rise and the transistors would be back-biased, thereby cutting off the input noise. As the voltages at terminals 10 and 11 rise above +1 volt, the transistors 14 and 15 draw a bit of current which tends to drop the potential at terminal 17 below the zero current level. This is a form of shutoff which prevents or reduces the probability of the circuit firing on noise.

The pulse output from the chopper comprises a series of pulses designated A and B, with spaces therebetween, those pulses corresponding to the potentials at terminals 10, 11, respectively. If the potentials at input terminals 10 and 11 are equal, then the waveforms A (near 33 in FIG. 1) are of the same height as the waveforms B. This series of trapezoidal waves is of twice the line frequency when the voltages of A and B are equal. If those voltages are not equal, then one of these waves will increase in amplitude and the other will decrease, giving rise to a line-frequency component which is hereinafter referred to as the "control signal." It is this signal that appears at point 33. The control signal is at line frequency.

The function of the amplifier and phase inverting network comprising transistors 34 and 35 is to amplify and phase-invert the in-phase component of the control signal. There is a direct current feedback from transistor 34 which tends to clamp out whichever of the waveforms A or B is the smaller.

Transistor 34 is biased on rather weakly and operates in class $AB_2$, which is to say that it does draw quiescent current, but the presence of a signal at 39 increases the average current drawn, thereby raising the D.C. voltage drop across resistor 42 and capacitor 44. This decreases the gain of the transistor for negative-going signals at 39 and raises the average value of the potential at 39, thus further tending to clamp out the negative-going signals. The direct current voltage at point 33 tends to rise to the approximate level of the smaller of the two waves A or B.

The phase inverter including transistor 35 is designed to be highly unilateral and to provide a large measure of isolation between the load network presently described and the chopper. It may be seen that the signal at point 33 reverses in phase when the relationship $(A-B)$ changes sign.

When terminal 10 is more positive than terminal 11, points 17 and 39 are driven more positive when the base of transistor 14 is driven negative. Conversely, when 11 is more positive than 10, points 17 and 39 are driven more positive one-half cycle later when the base of 15 is driven negative. Thus a phase reversal in the output occurs.

The network comprising transistors 34 and 35 comprises a pair of common-emitter stages arranged in cascade. Both are NPN type transistors, collector reverse bias being provided from terminal 36, which is connected to a source of biasing energy (20–30 volts D.C.). The collectors of transistors 34 and 35 are connected to this terminal 36 via resistor 37 (5100 ohms) and resistor 38 (470 ohms), respectively. The base of transistor 34 is provided with forward bias by connection to the junction 39 of a voltage divider network comprising a pair of resistors 40 and 41 (100,000 ohms and 11,000 ohms, respectively). The collector load resistor 37 and the emitter load resistor 42 (1100 ohms) for transistor 34 are bypassed by capacitors 43 (0.02 microfarad) and 44 (10 microfarads), respectively. The collector output of the amplifier stage comprising transistor 34 is coupled to the base of transistor 35 via a coupling capacitor 45 (2.2 microfarads). Transistor 35 has an emitter resistance 46 (470 ohms), and its base is provided with bias by being connected to the junction of resistors 47 (100,000 ohms) and 48 (1100 ohms), these latter resistors being included in a voltage divider with resistor 38, between biasing terminal 36 and ground.

The transistors 34 and 35 are illustratively of Type 2N335. It should be noted that all parameters herein mentioned are furnished by way of illustration, they having been used in one successfully operated embodiment of the invention, and are not intended to be limiting.

because those of skill in this art will be aware that the novel combination here shown is of utility with various ranges and types of parameters suitable to particular applications incorporating the invention.

The output of the phase splitter stage is applied to the load network comprising the loads 52 and 53, arranged in a bridge network with silicon controlled rectifiers 54 and 55 (each Transitron TSW6OC). The emitter and collector of transistor 35 are coupled to this network by coupling capacitors 57 and 58 (each 0.12 microfarad). Between the coupling lines 59, 60 and ground there are provided clamping diodes 61 and 62 (each Type 1N914), which clamp the gate of the silicon controlled rectifiers and load network to ground, preventing high reverse bias from existing under any conditions. Reference voltage input terminal 29 is connected to ground and to the junction of the silicon controlled rectifier diodes 54 and 55, and reference voltage input terminal 30 is connected to the junction of the loads 52 and 53.

The operation is such that, whenever the signal voltage arriving at the gate of rectifier 54 or 55 exceeds the triggering level requirement of a silicon controlled rectifier at a time when the anode of that rectifier is positive, then that rectifier will fire. Thus, making A greater than B will cause one of the silicon controlled rectifiers 54 or 55 to fire, and making B greater than A will cause the other silicon controlled rectifier to fire. Thus with changes in sign of the input function $(A-B)$, load current can be transferred from load 52 to load 53 or vice versa. These loads 52 and 53 are direct current devices which receive pulses which are essentially half-wave rectified currents.

The short quiescent period Y (FIG. 2), which was set into the chopper waveform by the Zener diode 22, serves to provide a small allowance for time delay so that the conduction pulse on 54 or 55 will begin a short time after the positive swing of the cycle. This is controllable by either controlling the line voltage or by changing the Zener voltage offset of 22. The slight delay permits the system to tolerate small phase errors in the amplifiers or chopper, so that at no time do both rectifiers 54 and 55 attempt to fire. This factor is particularly important in magnetic latching relays, bidirectional rotary solenoid motors, and similar devices. A very small residual current flowing in the one load portion, which may be one of the motor coils or relay coils, can effectively block the operation of the device even though a much larger current flows in the other load portion. Thus an adjustable margin for crossover is provided.

The response of this device is illustrated in FIG. 4, where load 52 current and load 53 current are plotted versus $(A-B)$ voltage. The slope illustrated in this figure is the result of a slightly changing phase angle with signal strength $(A-B)$ due to the rise time shown in FIG. 3. For very small signals $(A-B)$ the amplifier may have to go to very nearly the full trapezoidal waveform before 54 or 55 fires. Conversely, for large signals 54 and 55 will fire far down on the slope. The trapezoidal waveform thus provides a slightly changing firing phase angle for the silicon controlled rectifiers 54 and 55. However, in no case does this firing delay need to exceed a few electrical degrees on the line voltage. Therefore, the slope is extremely steep—i.e., the transfer from full current in load 52 to full current in load 53 is quite precipitous with the exception of the flat dead space where no current flows at all. This is the signal area where $(A-B)$ is not sufficiently great to fire the silicon controlled rectifier.

One of the advantages of this amplifier immediately becomes obvious. Since the dead space is adjustable by the gain of the amplifier and phase inverter, it is readily tailored to any convenient value. The amplifier constructed and illustrated in FIG. 1 had approximately 40 decibels of gain between terminals 10, 11 and the output of transistor 35. Under these circumstances 5 millivolts difference between terminals 10 and 11 is adequate to reliably activate either load 52 or load 53. The gain of the amplifier may be appreciated when it is realized that the input power $(A-B)$ corresponded to 5 millivolts across an 11,000 ohm load impedance presented by the input of the entire amplifier in activate condition. This represents an input power of only $2 \times 10^{-9}$ watts. Since the silicon controlled rectifiers 54, 55 are triggering devices, their output currents depend only upon the impedances of the loads 52 or 53 and may be any current up to the full rating of the rectifiers 54 and 55. In this case the rectifiers 54 and 55 are rated at 60 volts and 200 milliamperes. However, they were run at 32 volts. If the full rated current is then drawn, remembering that the device only passes half sine waves, the output power maximum is 3.2 watts into either load 52 or load 53. It is noteworthy, however, that the same amplifier and phase inverter will drive silicon controlled rectifiers having a rating of 10 amperes at 400 volts, yielding an output of 2 kilowatts and an over-all system power gain of $10^{12}$, which is very large for a small solid state device. Furthermore, the quiescent current of this device when operating in the dead space is only approximately 11 milliamperes direct current at 20 to 30 volts; thus in a balanced or quiescent condition the amplifier uses only $3/10$ of a watt with the silicon controlled rectifiers unfired. Maximum sensitivity of the amplifier is principally limited by the miscellaneous spiking introduced due to the rough squaring of the waveform and switching transients in the input end. However, and additional stage of transistor amplification with some minor filtering would have readily allowed the system to operate at much lower input voltages, and correspondingly higher power gain.

Generally speaking, the FIG. 1 system comprises a differential amplifier of substantial gain cascaded with a threshold amplifier system providing further gain and in turn cascaded with a differential load network having high power handling capabilities. Dead space is initially provided by the Zener offset of the diode 22, and as will be seen, the width of the dead space may be varied by changing the gain of the system. The crossover slope may be varied by changing the magnitude of the reference voltage applied at the reference voltage input terminals 19 and 20. These parameters may be changed independently. While the chopper accomplishes high gain and converts the voltages at A and B—i.e., at the command signal input terminals 10 and 11—into the pulse waveforms A, B, A, B, etc., as shown near point 33 in FIG. 1, the threshold amplifying system comprising the transistors 34 and 35 recognizes the differential between the pulses A and the pulses B, and this amplifying system produces on its output lines 59 and 60 output pulses which are of one phase when the A pulses are of greater amplitude than the B pulses, and of the opposite phase when the B pulses are greater than the A pulses. In the one case the silicon control rectifier 54 is fired and the load 52 is energized. In the other case the silicon control rectifier 55 is fired and the load 53 is energized. In either event there is a substantial dead space in the FIG. 4 characteristic, which dead space may be adjusted. There is further a substantial attack slope, which attack slope can be adjusted.

Referring further to FIG. 4, it will be observed that there is a substantial voltage interval during which the load current in both loads is zero. This is the dead space or dead band.

The silicon controlled rectifier are most readily operated with the emitters grounded, and each is triggered into conduction when the anode is positive by a positive signal on the gate (i.e., applied at 29–30). Since the anodes are connected to the "hot" side 30 of the line through their respective loads 52 and 53, they are excited in phase. Since both anodes go positive on the same half cycle, the signals from 59 and 60 can only trigger one or the other. A positive-going signal on the base of the phase inverter transistor 35 will increase the current through this transistor, thus making the base voltage go more positive and the collector voltage go more negative. Thus the voltages on lines 59 and 60 are in phase opposition; one is in phase with the input signal, and the other is 180 degrees out. The control signal voltage will be either in phase or 180 degrees out with the line, depending on whether 10 or 11 is more positive. Therefore one of the voltages on lines 59 or 60 will be of the proper phase to fire one of the rectifiers 54 or 55. This voltage need only be of a proper amplitude for the firing to take place. Minor phase errors of a few degrees due to amplifier phase shifts are absorbed by the dead time set into the reference wave by the Zener diodes 22. Reversing the magnitudes of voltages at 10 and 11 will switch the phase at 59 and 60, thereby firing the other rectifier 54 or 55.

Figure 5:
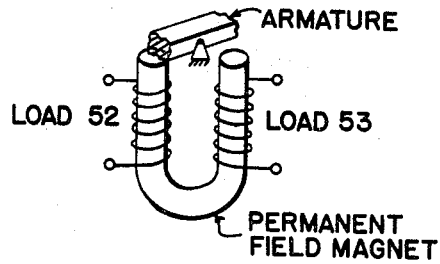
FIG. 5 is a perspective view showing how the loads 52 and 53 may comprise windings of an electromagnet.
Figure 6:
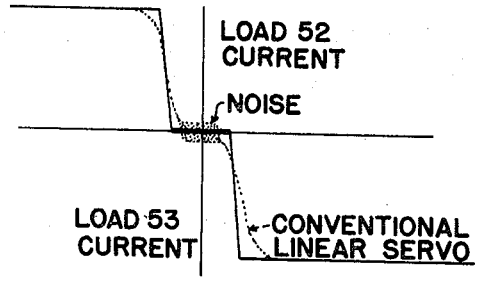
FIG. 6 is a comparison of the FIG. 4 types of curves as produced by a conventional linear servo system (see dashed lines) and a servo system in accordance with the invention (see full lines)

A suitable pair of loads 52 and 53 are illustrated in FIG. 5. FIG. 5 shows a horseshoe-type permanent magnet comprising a magnetic armature and two windings, one one each field pole leg. This relay is shown as tripped by load or winding 52. The high reluctance of the air gap at the south pole of this magnet is such that a very substantial production of magnetic flux by winding or load 53 would be required to tilt the armature over into contact with the south pole. Any small residual current in the winding 52 would strongly tend to hold the armature in the position shown. The advantage of the adjustable dead space provided by the invention will therefore be apparent.

Figure 7:
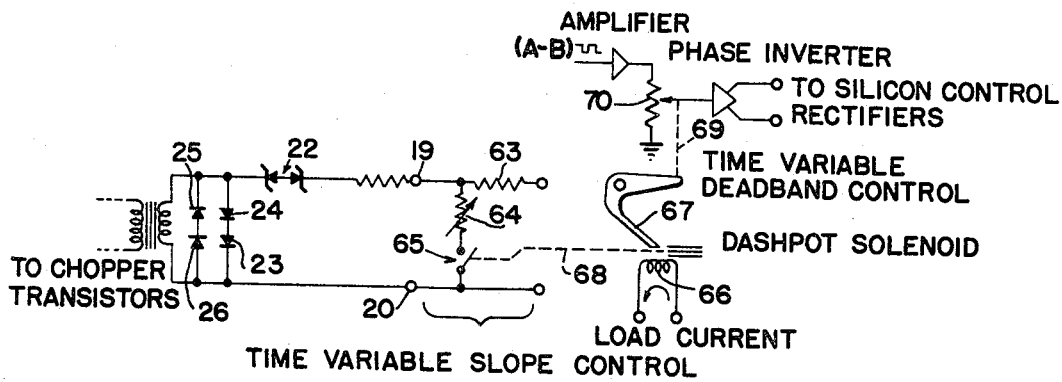
FIG. 7 shows fragmentary portions of a modified form of servo system in accordance with the invention in which the dead space and crossover slopes are automatically adjustable.

Reference is now made to FIG. 7, which shows means for varying the adjustment of the crossover slope—i.e., the slope illustrated in FIG. 4—or the gain of the threshold amplifying system (and therefore the dead space). As to the crossover slope, such variation is simply a matter of varying the resistance in the system. For example, there is inserted ahead of the reference voltage input terminals 19 and 20 a network comprising a series resistor 63 and a variable shunt resistance 64, the latter being in series with a switch 65. When the switch is closed, any appropriate desired setting of the resistance 64 will cause a decreased reference voltage to be applied to the chopper, thereby reducing the magnitude of the crossover slope. It is desirable automatically to do this when using the servo system to control a springy load. In that case the current in such load, for example load 52, can be sampled as by a field coil 66, and such coil may be used to activate the moving element 67 of a dash pot ganged in any suitable manner 68 to the switch 65 to close the same when appreciable load current is drawn. The advantage of the slope control is that it reduces the firing angle of the silicon controlled rectifiers and therefore the average load current for small command signals.

The dash pot may also be used to control the dead space by increasing the amplifier gain as soon as appreciable load current is drawn.

Decreasing the reference voltage increases the dead space and decreases the slope of the over-all system, since the rise time for a given fixed voltage interval is greater at the top of a sine wave than it is at the axis crossing. In addition, the average current in the active load is reduced, since the silicon controlled rectifiers fire later in the cycle due to the increased dead space. This gives the system an initial impulse to start a "sticky" load and immediately reduces gain to avoid hunting due to "springiness" in the load. Both of these effects present severe problems to stepper type servos. In a situation where a very smoothly moving load was presented with no "stickiness" or "springiness," either the dead band control or the gain control could be applied in a reverse sense. For instance if the servo here shown were used to control water level in a tank, this effect would give a toggle action to the device. With a widened dead band and increased dead time, the system would do nothing until a substantial error signal developed. Then it would turn on a solenoid valve, for example, slowly at first, due to the decreased firing angle, and then rapidly increase sensitivity up to maximum to precisely shut off the water at the equilibrium level of 10 and 11. Such behavior would prevent the servo from continually "dribbling" water through the valve and is permissible because the load has neither "stickiness" nor "springiness."

The dash pot may be ganged as shown at 69 to an adjustable potentiometer network 70 inserted between the amplifier which includes transistor 34 and the phase inverter which includes transistor 35. While the dash pot movable element 67 is here shown as accomplishing both automatic controls via the ganging expedients 68 and 69, it will be obvious that the controls can be made independent of each other by using two dash pots, or either of the controls may be dispensed with.

A dash pot is only one type of decay element, and it is within the scope of this invention to utilize any effectively clocked mechanical expedient for the purpose of sensing the presence of substantial load current and activating either the slope control or the gain control, or both.

While there has been shown and described what is at present considered to be the preferred embodiment of the invention, it will be understood by those skilled in the art that various changes and modifications may be made therein without departing from the true scope of the invention as defined by the appended claims.

I claim:
1. The combination of:
 a sine wave reference signal source;
 a chopper amplifier comprising a pair of input terminals to which command voltages are applied, a reference signal input circuit, and a single-ended output circuit;
 means coupled between said source and said chopper for shaping each sine wave of reference signal applied to said chopper into a pair of truncated half wave forms separated by a no-current dead space, whereby there appear in said output circuit a series of spaced pulses having amplitudes alternately representative of the command voltages at said input terminals;
 means having an input circuit connected to said output circuit and a double-ended output comprising two output terminals for further amplifying and phase-inverting said pulses, whereby there appear at one output terminal an amplified component in phase with said reference signal, and at the other output terminal an amplified component out of phase with said reference signal, the respective voltage levels at the input terminal determining at which of said output terminals the in-phase component appears;
 first and second normally non-conductive load circuits coupled to said output terminals, each of said load circuits including a gate element;
 and means for coupling the gate elements to said reference signal source, whereby the load circuit coupled to the output terminal producing the in-phase component is rendered conductive.

2. The combination in accordance with claim 1 together with means for sensing the load current and means responsive to the sensing means for varying the slope of the truncated half wave forms.

3. The combination of:
 a sine wave reference signal source;
 a chopper amplifier comprising a pair of input terminals to which command voltages are applied, a reference signal input circuit, and a single-ended output circuit;
 means coupled between said source and said chopper for shaping each sine wave of reference signal applied to said chopper into a pair of truncated half wave forms separated by a no-current dead space, whereby there appear in said output circuit a series of spaced pulses having amplitudes alternately representative of the command voltages at said input terminals;

and means having an input circuit connected to said output circuit and a double-ended output comprising two output terminals for further amplifying and phase-inverting said pulses, whereby there appear at one output terminal an amplified component in phase with said reference signal, and at the other output terminal an amplified component out of phase with said reference signal, the respective voltage levels at the input terminal determining at which of said output terminals the in-phase component appears.

4. The combination in accordance with claim 3 in which the shaping means includes a back-to-back Zener diode for providing an offset between reference voltage and reference current.

5. The combination in accordance with claim 4 in which the reference signal input circuit comprises a transformer having a primary and a secondary, and in which the shaping network further includes a first series chain of limiter diodes of one polarity in shunt with said primary and a second series chain of limiter diodes of the opposite polarity in shunt with said primary.

6. The combination in accordance with claim 5 in which the chopper comprises a pair of transistors each having an emitter and a base and a collector, the emitters being connected to said input terminals, the bases being connected to said secondary, and the collectors being connected together.

7. The combination of:
a sine wave reference signal source;
a chopper amplifier comprising a pair of input terminals to which command voltages are applied, a reference signal input circuit, and a single-ended output circuit;
means coupled between said source and said chopper for shaping each sine wave of reference signal applied to said chopper into a pair of truncated half wave forms separated by a no-current dead space, whereby there appear in said output circuit a series of spaced pulses having amplitudes alternately representative of the command voltages at said input terminals;
means having an input circuit connected to said output circuit and a double-ended output comprising two output terminals for further amplifying and phase-inverting said pulses, whereby there appear at one output terminal an amplified component in phase with said reference signal, and at the other output terminal an amplified component out of phase with said reference signal, the respective voltage levels at the input terminal determining at which of said output terminals the in-phase component appears;
first and second normally non-conductive load circuits coupled to said output terminals, each of said load circuits including a silicon controlled rectifier gate element;
and means for coupling the gate elements to said reference signal source, whereby the load circuit coupled to the output terminal producing the in-phase component is rendered conductive.

8. The combination in accordance with claim 7 in which each of the silicon controlled rectifiers comprises a cathode and an anode, and in which the cathodes are connected to a point of reference potential and the anodes to their respective loads, each load circuit being in series with one of the output terminals, and in which both load circuits are paralleled across the reference signal source.

9. The combination in accordance with claim 8 in which there is provided means for clamping the cathodes of the silicon controlled rectifiers to ground.

10. The combination in accordance with claim 8, means for sensing load current, and means responsive to the sensing means for varying the gain of said means having an input and an output circuit.

11. The combination in accordance with claim 10 in which the shaping means includes Zener diode means for providing an offset between reference voltage and reference current as applied to the chopper amplifier, and means responsive to the sensing means for varying the slope of said truncated half wave forms.

12. The combination of:
a chopper amplifier comprising a pair of transistors each having an emitter and a base and a collector, the emitters providing input terminals to which command voltages are applied and the collectors being connected together to provide an output circuit;
a transformer having a primary and a secondary connected to said bases;
means for applying to the primary reference signals shaped as truncated half wave forms of alternating polarity, whereby there appears in said output circuit a series of spaced pulses having amplitudes alternately representative of the command voltages applied to said emitters;
transistor means for amplifying and phase-inverting said pulses;
and means for coupling the chopper amplifier to the amplifying and phase-inverting means and biasing the latter means in such fashion that the pulses representing the larger command voltage are recognized.

13. The combination in accordance with claim 12 in which the coupling means comprises a shunt resistor and a series resistance-capacitance network.

14. The combination in accordance wtih claim 12 in which the amplifying and phase-inverting means comprises a pair of transistor stages, the first transistor stage comprising a transistor having a base and an emitter and a collector arranged in the common emitter configuration and a resistance-capacitance network connected to said emitter.

References Cited

"Clipping, Clamping, and Gating Circuits": National Radio Institute, 1963 Edition, pp. 14 and 15.

ROBERT K. SCHAEFER, *Primary Examiner.*

H. J. HOHAUSER, *Assistant Examiner.*

U.S. Cl. X.R.

307—237